United States Patent
Zimmermann et al.

(10) Patent No.: US 7,260,449 B2
(45) Date of Patent: Aug. 21, 2007

(54) DEVICE FOR CONVEYING AND POSITIONING OF STRUCTURAL ELEMENTS IN NON-CONTACT WAY

(75) Inventors: Josef Zimmermann, Regensburg (DE); Dirk Jacob, Marktoberdorf (DE); Adolf Zitzmann, Teunz (DE)

(73) Assignee: Technische Universität München, München (DE)

( * ) Notice: Subject to any disclaimer, the term of this patent is extended or adjusted under 35 U.S.C. 154(b) by 33 days.

(21) Appl. No.: 11/212,032

(22) Filed: Aug. 25, 2005

(65) Prior Publication Data
US 2006/0064199 A1 Mar. 23, 2006

Related U.S. Application Data

(63) Continuation of application No. PCT/DE2004/000341, filed on Feb. 25, 2004.

(30) Foreign Application Priority Data
Feb. 25, 2003 (DE) ............... 103 08 244

(51) Int. Cl.
*G06F 7/00* (2006.01)

(52) U.S. Cl. ............ 700/229; 198/370.04; 198/493; 198/358; 406/88; 406/86; 406/3; 406/19; 406/31

(58) Field of Classification Search ........ 700/229, 700/213, 228; 198/370.04, 493, 358, 349, 198/359; 406/88, 86, 92, 3, 19, 31, 153; 65/25.2, 25.1, 182.2
See application file for complete search history.

(56) References Cited

U.S. PATENT DOCUMENTS

| | | | |
|---|---|---|---|
| 3,395,943 A | 8/1968 | Wilde et al. | |
| 3,866,906 A * | 2/1975 | Berry | 271/227 |
| 5,222,840 A * | 6/1993 | Ingraham et al. | 406/88 |
| 6,637,585 B2 * | 10/2003 | Takasan et al. | 198/752 |
| 6,736,588 B1 * | 5/2004 | Baldwin et al. | 414/676 |
| 6,808,358 B1 * | 10/2004 | Mayerberg et al. | 414/676 |
| 2002/0088693 A1 | 7/2002 | Takasan et al. | |
| 2002/0182047 A1 * | 12/2002 | Adam et al. | 414/676 |

FOREIGN PATENT DOCUMENTS

| | | |
|---|---|---|
| DE | 87 09 379 U | 8/1987 |
| GB | 2 133 757 A | 8/1984 |

* cited by examiner

*Primary Examiner*—Khoi H. Tran
(74) *Attorney, Agent, or Firm*—Henry M. Feiereisen

(57) ABSTRACT

In a device for conveying and positioning structural elements at a conveying track, a structural element is brought into pending state at the conveying track and the conveying track is tilted in conveying direction so that the structural element slides downwards to approach a target point. The position of the structural element is detected. The device further includes a control unit wherein the position of the structural element is detected within a predetermined range of the target point to be reached, and a time, at which the conveying track is tilted and re-tilted at a predetermined angular speed by a predetermined angle, is determined by using a calculation and control algorithm, so that the structural element is intercepted.

12 Claims, 2 Drawing Sheets

DEVICE FOR CONVEYING AND POSITIONING OF STRUCTURAL ELEMENTS IN NON-CONTACT WAY

CROSS-REFERENCES TO RELATED APPLICATIONS

This application is a continuation of prior filed copending PCT International application no. PCT/DE2004/000341, filed Feb. 25, 2004, which designated the United States and on which priority is claimed under 35 U.S.C. §120 and which claims the priority of German Patent Application, Ser. No. 103 08 244.1, filed Feb. 25, 2003, pursuant to 35 U.S.C. 119(a)-(d).

BACKGROUND OF THE INVENTION.

The present invention relates to a device for conveying structural elements sensitive to touch along a conveying track in a non-contact way. Furthermore, the invention relates to a device for positioning structural elements sensitive to touch on a conveying track.

Several technologies for transporting structural elements, containers or materials held pending along a conveying track are known. Especially, conveying systems which use air bearings for conveying, and magnetic systems which utilize repulsive forces generated by homopolar magnets are known. Also, the principle of so-called sound levitation is conventionally used for conveying structural elements very sensitive to touch. According to this technology, sound waves are eratiated by a conveying track, which generate an air cushion for the structural element to be conveyed pendingly.

The structural elements to be conveyed pendingly are not allowed to contact other parts, even if they are accelerated or decelerated. Conventionally, acceleration and deceleration of structural elements is realized by using a fan, for example. However, this technology shows several disadvantages. The gaseous material used for accelerating and decelerating structural elements must meet clean-room conditions, i.e. must be filtered very strongly. Moreover, particle eventually present may be whirled up by the turbulence generated during the blowing operation. Therefore, with this technology, it is impossible or very difficult to stop the conveyed structural elements at the predetermined position on the conveying track. In case of conveying very light-weighed structural elements, such elements can be blown off from the given track by air or gas whirls appearing stochastically. Also, particle-like material can be accelerated by the blowing operation.

SUMMARY OF THE INVENTION

Therefore, object of this invention is to provide an improved device for conveying structural elements along a conveying track in a non-contact way, wherein acceleration and deceleration is to be performed in a non-contact way, too. Another object of this invention is to provide a device for positioning structural elements on a conveying track in a non-contact way.

This object is achieved by a device for conveying and positioning of structural elements (2) at a conveying track (1), which device includes means for generating a pending state of the structural elements (2) at the conveying track, means (3) for tilting the conveying track (1) in transport direction (5) of the structural elements (2) so that these elements slide downwards in a non-contact way to a target point by the action of gravity, means (6, 7) for detecting the position of the structural element (2) in a non-contact way, and a control unit (8), wherein the position of the structural element (2) is detected within a predetermined range (A-B) of the target point to be reached, and a time, at which the conveying track (1) is tilted and re-tilted at a predetermined angular speed by a predetermined angle, is determined by using a calculation and control algorithm, so that the structural element is intercepted, and wherein, after carrying out swivelling, the conveying track (1) is horizontally adjusted and the sturctural element (2) is kept pending at the target point (Z).

There is provided a device for conveying and positioning structural elements in a non-contact way, wherein it is preferred to use an inclined conveying track on which the structural elements are sliding downwards. The means for making structural elements pending are known from the prior art. Fundamental idea of this invention is to decelerate, in a non-contact way, a structural element moving at a speed v on a track and approaching a target point thereon. As soon as the structural element enters a predetermined portion of the track, its position and/or speed is detected and these data are transferred to a computer. A computing and control algorithm determines, at which time, at which angular speed and up to which angle the conveying track has to be tilted upwards to stop the structural element at or close by a predetermined target position. It is not necessary to reach that position by a single tilting operation. Depending on technological requirements, the conveying track can be alternately tilted upwards and downwards several times to level adjust the structural element to the predetermined target point. It is advisable to continue the level adjusting control, even if the pending structural element has already reached the predetermined target point, as there is the possibility that the pending structural element drifts away from the target point by external forces such as vibrations or by stochastic effects. The structural element is kept equilibrated around the target point by carrying out a readjusting control continuously. Also in a case, that the conveying track or that portion thereof on which the structural element is kept pending, is moved itself along a space curvature, such level adjusting operation may not be dispensed with. This will be dealt with in detail in the description of an embodied example.

If technologically and constructively required, the level adjusting operation must also be carried out perpendicularly to the conveying direction, that is along two coordinates to prevent the structural element from sliding off the conveying track laterally.

Several types of drives for carrying out such a level adjusting operation by tilting the conveying track are available, e.g. an electric servomotor which drives a tilting table.

Optical, inductive or capacitive sensors, image-recognition means or combinations thereof can be used for detecting the position of a conveyed structural element continuously. Such means are known from the prior art and have to be matched, solely.

As control algorithms for level adjusting a structural element at the target point are also known, an expert in the field of control engineering can select that one he needs based on technological boundary conditions and match it correspondingly, if necessary.

The same is true for that case, that a conveying track or a portion thereof, on which a pending structural element must be held at the target position, vibrates or moves itself within a space.

According to another feature of the present invention, only a single portion of the conveying track is arranged swivelling, preferably its end portion. This embodiment is advantageous in that this single portion is low in weight and, due to its small moment of inertia, requires less energy for swivelling.

Also, there is the possibility to arrange several swivelling portions to be used as magazines or switches. In other words, the conveying track can be divided into a great number of single sections. Each of these sections is formed so that it can bear a structural element pending and level-adjusted on it.

If this device is used as magazine for example, the structural element on the last single section is removed and the structural element on the next to the last single section is transferred to the last one. In this way, all of the structural elements are moved forward by one position at a time.

According to another feature of the present invention, each of the single sections is arranged so that it can be swivelled in different directions. This allows them to be used as switches. If such a single section is swivelled laterally, the structural element on it is not transferred to the next position on the same conveying track, but onto an other conveying track.

Furthermore, there is the possibility to form at least one of the single sections so that it can be moved out of the conveying track completely, in order to transfer the structural element on it to a treatment station arranged away from this conveying track, wherein, when a suited readjusting control is carried out permanently, this single section can be moved along an arbitrary space curvature without losing the structural element, by using centrifugal forces.

According to another feature of the present invention, the means for detecting the position of a structural element in a non-contact way include optical, inductive and capacitive sensors which are selected depending on technological boundary conditions, wherein combinations thereof can also be used.

According to another feature of the present invention, the means for detecting the position of a structural element in a non-contact way include a camera provided with an image-recognition software. This embodiment may be expedient in that case, that the positions of complex three-dimensional structural elements have to be detected, an operation which is too costly to be realized by using conventional sensors.

According to another feature of the present invention, the means for keeping structural elements pending on a conveying track include air bearings. Such air bearings are sufficiently known from the prior art so that a description thereof is omitted. However, air bearings have to be matched to the shape and the mechanical properties of a structural element or a material to be conveyed.

According to another feature of the present invention, means for generating a levitation sound field are arranged at the conveying track to make structural elements pending. This technology, which is sufficiently described in the correspondent patent and technical literature, can be utilized for example to convey wafers under clean-room conditions.

According to another feature of the present invention, means for generating conditions which make structural elements pending comprise vacuum-cleaners and units generating a levitation sound field, wherein the vacuum-cleaner is used to suck the structural element to the surface of the conveying track, while the levitation sound field, which is emitted from the conveying track, is used to push the structural element away from it. In this way, a stable levitation state is maintained. This embodiment of the invention is preferably used in cases where the structural element is to be further stabilized when being conveyed or held at the target point.

According to another feature of the present invention, the means for swivelling the conveying track or a single portion thereof comprise means for carrying out rough positioning and fine positioning. Dividing the positioning operation into rough one and a fine one is advantageous in that case, that a structural element has to be positioned at the target point accurately and held there in that state.

According to another feature of the present invention, rough positioning is carried out by a servomotor, whereas fine positioning is carried out by a piezomechanical drive. Piezomechanical drives comprise a very high positioning frequency and therefor, they are capable to correct also least deviations in the position of a structural element.

In summary, it should be emphasized that the fundamental idea of this invention can be realized by using those means for making structural elements pending, which are known to experts in this field. However, it must be mentioned that solids only can be brought into a pending state, substantially. If powder materials are conveyed by sound levitation, there is the probability that a few particles only contact the conveying track momentarily. However, in this case also, conveying is substantially considered to be carried out in a non-contact way.

BRIEF DESCRIPTION OF THE DRAWING

Now, embodiments of this invention are described with reference to the accompanying drawings.

DETAILED DESCRIPTION OF PREFERRED EMBODIMENTS

Figure 1:
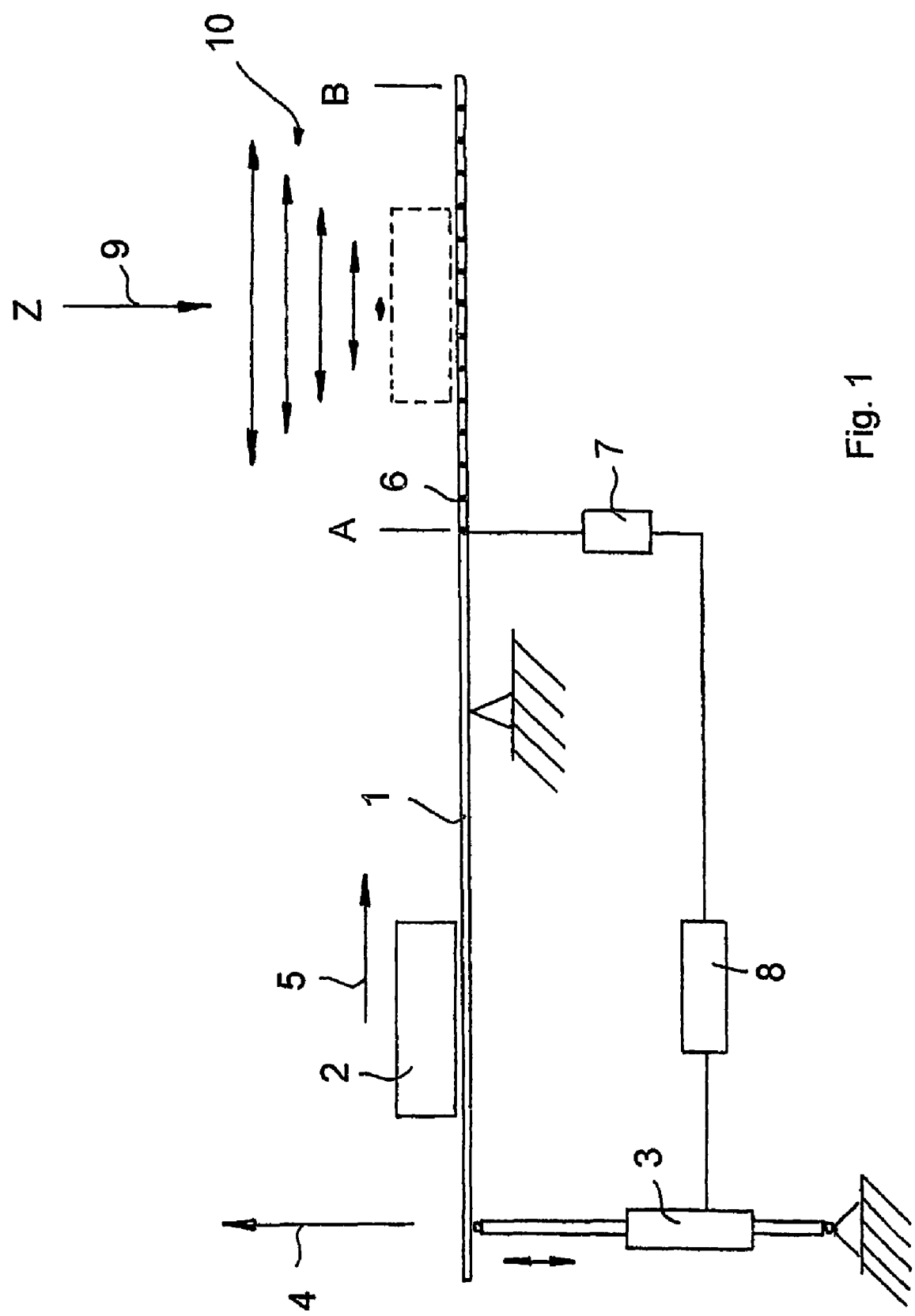
FIG. 1 shows a first embodiment of the invention.

Referring to FIG. 1, a conveying track 1 is set into a vibrational state by ultrasonic vibrations which are generated by a vibration generating device (not shown) and are suited to make a structural element 2 pending at a distance a over the conveying track 1. A tilting device 3 is operated to tilt the conveying track 1 in a direction marked by an arrow 4 so that the structural element 2 begins to slide in a direction marked by an arrow 5. Position detecting means 6 are arranged on a section A-B. As soon as the structural element 2 slides onto the section A-B, position detecting means 7 detect the position thereof and at what speed and in what direction it moves. The measured values and signals detected by the position detecting means are transferred to a control unit 8. The control unit 8 controls the tilting device 3 on the basis of a given control algorithm.

The effect of the control algorithm is described below.

As soon as the structural element 2 slides onto the section A-B, the sliding speed thereof is detected and transferred in shape of a control signal to the control unit 8. Then, the control unit 8 causes the tilting device 3 to tilt the conveying track 1 in the opposite direction so that, after a very short time, the structural element 2 is stopped and begins to slide downwards in the opposite direction. During this movement, position, speed and moving direction of the structural element 2 are again detected by the position detecting means 7. Depending on these measured values, the tilting device is operated again in the opposite direction. With this embodiment, five tilting steps are carried out to level adjust the structural element 2 to the target point Z within a predetermined tolerance, indicated by double arrows 10. To prevent the structural element from leaving that target point Z, the levelling control unit is kept operating. If the structural element 2 is accelerated by external forces unintentionally, it is again level-adjusted to the target point Z.

An expert in the field of control engineering certainly knows that level adjustment of structural elements can be carried out in less than five steps, by optimizing the control algorithm.

Figure 2:
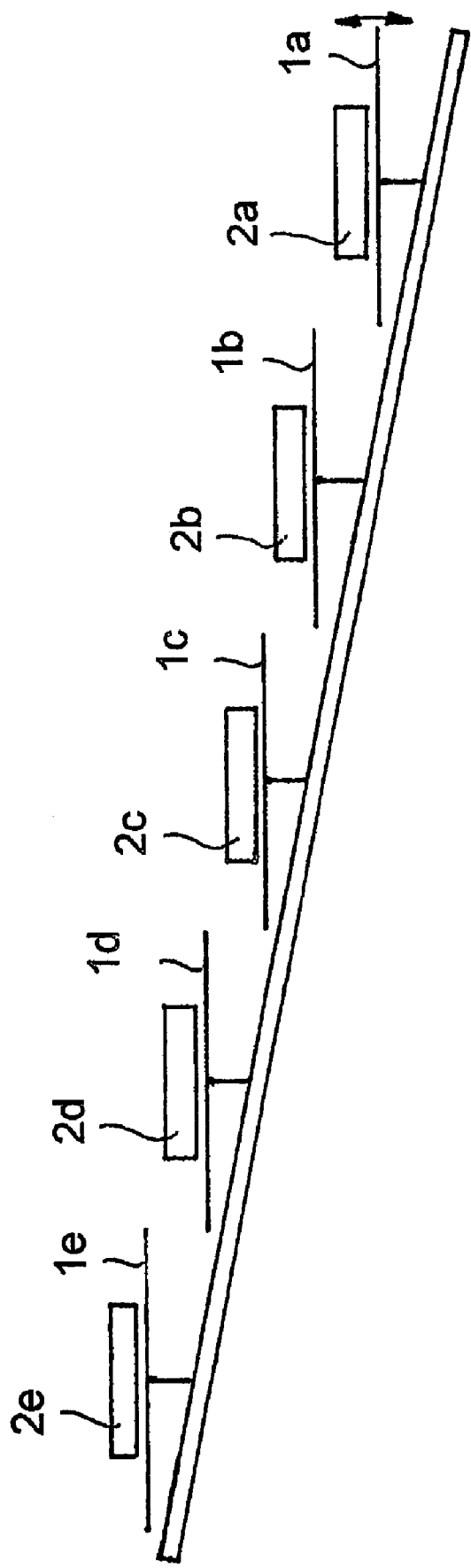
FIG. 2 shows a second embodiment of the invention.

As shown in FIG. 2, the conveying system according to the second embodiment of the invention is divided into a number of single sections 1a to 1e which are arranged on a downwards inclined plane, whereby each of which can be swivelled separately. Structural elements 2a to 2e are level-adjusted to target points which are determined to be in the centre of these sections, for example. As the single sections 1a to 1e are designed as the first embodiment according to FIG. 1, details thereof are not shown.

The conveying system according to the second embodiment of this invention, which is shown in FIG. 2, can be used for different purposes as follows:

When section 1a is tilted and the structural element 2a on it slides downwards, this section and can take up the structural element 2b on section 1b. To this end, section 1a and section 1b are tilted in parallel to the inclined plane so that the structural element 2b can slide down onto section 1a. As soon as this structural element is, in its full size, on section 1a, the control algorithm mentioned in the description of FIG. 1 is activated to level adjust the structural element 2b. This kind of transfer of a structural element onto a just emptied section is used to store or puffer structural elements. Therefore, there is the possibility to store structural elements or other materials intermediately and to take them up on call.

This embodiment can also be used as follow:

If selected sections are arranged so that they can be pivoted laterally, there is the possibility to use them as switches. If, for example, section 1a is arranged so that it can be swivelled downwards and to the right and to the left as well, it can serve as a three-way switch.

The second embodiment shown in FIG. 2 can also be used advantageously as described below.

There is the possibility to arrange the sections so that can be removed and taken up by a robot to transfer them to free places of an other conveying track. An expert in this field certainly knows that such a robot has also to take up and transfer the control device for level-adjusting a structural element, which is mentioned in the description of the first embodiment according to FIG. 1. However, there is also the possibility to design the hand of the robot like one of the conveying sections 1a to 1e and to implement the control device for level-adjusting a structural element into the control algorithm of the robot. By using these technical fundamentals and the centrifugal forces acting on a structural element, a robot can be programmed so that, even if its hand is moved on a space curvature, the structural element, which is kept pending at the target point on the hand, does not slide off during such a kind of movement.

What is claimed:

1. Device for conveying and positioning of structural elements (2) at a conveying track (1), which comprises:
   means for generating a pending state of the structural elements (2) at the conveying track,
   means (3) for tilting and/or swiveling the conveying track (1) in transport direction (5) of the structural elements (2) so that these elements slide downwards in a non-contact way to a target point by the action of gravity,
   means (6, 7) for detecting the position of the structural element (2) in a non-contact way, and
   a control unit (8), wherein
   the position of the structural element (2) is detected within a predetermined range (A-B) of the target point to be reached, and a time, at which the conveying track (1) is tilted and re-tilted at a predetermined angular speed by a predetermined angle, is determined by using a calculation and control algorithm, so that the structural element is intercepted, and wherein, after carrying out swivelling, the conveying track (1) is horizontally adjusted and the structural element (2) is kept pending at the target point (Z).

2. Device according to claim 1, characterized in that at least one of the single sections of the conveying track is arranged so that it can be swivelled.

3. Device according to claim 2, characterized in that this single section can be swivelled in different direction.

4. Device according to claim 1, characterized in that the means (6) for detecting the position of the structural element (2) in a non-contact way include optical, inductive or capacitive sensors.

5. Device according to claim 1, characterized in that the means (6) for detecting the position of the structural element (2) in a non-contact way include a camera provided with an image-recognition software.

6. Device according to claim 1, characterized in that the means for generating a pending state of the structural element (2) are air bearings.

7. Device according to claim 1, characterized in that the means for generating a pending state of the structural elements (2) are means for generating a levitation sound field.

8. Device according to claim 1, characterized in that the means for generating a pending state comprise vacuum-cleaners and means for generating a levitation sound field, wherein the vacuum-cleaner serves to suck the structural elements (2) onto the surface of the conveying track (1), whereas the levitation sound field, which is emitted from the surface of the conveying track, serves to repel the structural element (2) from that surface so that a stable pending state is achieved.

9. Device according to claim 1, characterized in that the means (3) for swivelling the conveying track (1) or one of the single sections thereof comprise units for carrying out rough and fine positioning operations.

10. Device according to claim 9, characterized in that the unit for carrying out fine positioning comprises a piezomechanical drive.

11. Device according to claim 2, characterized in that the means (3) for swivelling the conveying track (1) or one of the single sections thereof comprise units for carrying out rough and fine positioning operations.

12. Device according to claim 11, characterized in that the unit for carrying out fine positioning comprises a piezomechanical drive.

* * * * *